(12) United States Patent
Chino et al.

(10) Patent No.: US 7,469,768 B2
(45) Date of Patent: Dec. 30, 2008

(54) STEERING CONTROL APPARATUS

(75) Inventors: Naotaka Chino, Kanagawa (JP); Noriki Kubokawa, Kanagawa (JP); Shogo Miyasaka, Kanagawa (JP); Takaaki Eguchi, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 316 days.

(21) Appl. No.: 11/441,884

(22) Filed: May 26, 2006

(65) Prior Publication Data
US 2006/0289227 A1 Dec. 28, 2006

(30) Foreign Application Priority Data
May 27, 2005 (JP) .............................. 2005-156237

(51) Int. Cl.
*B62D 5/06* (2006.01)
(52) U.S. Cl. .......................... 180/405; 180/402; 192/38
(58) Field of Classification Search ................. 180/402, 180/404, 405, 407; 701/41, 42, 43; 192/84.31, 192/38, 35
See application file for complete search history.

(56) References Cited
U.S. PATENT DOCUMENTS 6,766,888 B2 * 7/2004 Yasui et al. .................... 192/35
6,769,524 B2 * 8/2004 Yasui et al. .................... 192/35
6,938,721 B2 * 9/2005 Ono et al. ..................... 180/402
7,004,279 B2 * 2/2006 Shitamitsu et al. ........... 180/402
7,322,439 B2 * 1/2008 Hara et al. .................... 180/402
2003/0051961 A1 * 3/2003 Yasui et al. .................... 192/35
2003/0141134 A1 * 7/2003 Sherwin et al. .............. 180/402
2004/0182670 A1 * 9/2004 Nojiri et al. .................... 192/38

FOREIGN PATENT DOCUMENTS
JP 2004-090783 3/2004

* cited by examiner

*Primary Examiner*—Tony H. Winner
(74) *Attorney, Agent, or Firm*—Young Basile

(57) ABSTRACT

A vehicle steering system is disclosed that includes a steering portion, a steered portion, and a clutch mechanism. The steering portion includes operations input mechanism and a reaction adding device. The steered portion includes steering controlled wheels and a steered force adding device. The clutch mechanism mechanically connects the steering portion and steered portion through an engagement. The clutch mechanism has a permanent magnet and an electromagnetic coil so as to form an electromagnetic clutch that releases when a current is applied such that a magnetic force in the direction that cancels a magnetic force of the permanent magnet is generated for the electromagnetic coil. The electromagnetic clutch engages when a current is not applied to the electromagnetic coil. The vehicle steering system further includes a controller that generates the magnetic force in the same direction as the magnetic force direction of the permanent magnet for the electromagnetic coil when an abnormality is generated for the steering system.

10 Claims, 8 Drawing Sheets

STEERING CONTROL APPARATUS

RELATED APPLICATION

The disclosure of Japanese Patent Application No. 2005-156237, filed May 27, 2005, including its specification, claims and drawings is incorporated herein by reference in its entirety.

FIELD

The present invention relates to a vehicle steering system that employs a steer-by-wire system that is mounted with a clutch mechanism for fail/safe purposes.

BACKGROUND

When an abnormality is generated in the reaction actuator, the conventional steer-by-wire system cancels the reaction control and mechanically engages the steering wheel and steering controlled wheels using an electromagnetic clutch, and carries out power assisted steering control for the normal electric power steering system using a steered actuator (for example, see published Japanese application No. JP 2004-90783). In this case, the electromagnetic clutch has a structure that is released when a current is applied to the electromagnetic coil, and engaged when the current is not applied so that the clutch works even if the power supply to the electromagnetic coil is disconnected.

SUMMARY

In the above-mentioned conventional vehicle steering system, the electromagnetic clutch is not instantly engaged during an abnormality, causing a delay in engagement that corresponds to the time constant for the attenuation of the magnetic force of the coil. Therefore, reaction dropping, in which the reaction of the steering wheel becomes zero, is generated during the period from after the reaction control is cancelled until the steering wheel and steering control wheels are mechanically connected. When the steering wheel is steered under this reaction dropping condition, the amount of steering tends to overshoot, and this overshooting amount is added to the command value for the steered actuator. Thus, the ability of the vehicle to follow along the intended track of the driver deteriorates.

An embodiment of the present invention is carried out by taking the above-mentioned problem into account and has the objective of providing a vehicle steering system that may prevent deterioration of the ability of the vehicle to follow along an intended driver track by reducing the time of the reaction force dropping when an abnormality is generated in the steering system.

To achieve the above-mentioned objective, an embodiment of the present invention includes: a vehicle steering system and a clutch mechanism. The steering system has a steering portion and a steered portion. The steering portion includes an operations input detector and a reaction adding device. The steered portion has steering controlled wheels and a steered force adding device.

The clutch mechanism mechanically connects the steering portion and steered portion through an engagement. The clutch mechanism has a permanent magnet and an electromagnetic coil. The permanent magnet and electromagnetic coil form an electromagnetic clutch that releases when a current is applied such that a magnetic force in the direction that cancels the magnetic force of the permanent magnet is generated for the electromagnetic coil. The electromagnetic clutch engages when a current is not applied to the electromagnetic coil.

A clutch engagement controller generates a magnetic force in the same direction as the magnetic force direction of the permanent magnet for the electromagnetic coil when an abnormality is generated for the steering system.

According to an embodiment of the present invention, an electric current that generates a magnetic force in the same direction as the magnetic force direction of the permanent magnet is applied to the electromagnetic coil when there is an abnormality thereby reducing the time for the reaction force dropping due to a delay in the engagement of the clutch. Therefore, deterioration of the ability of the vehicle to follow the intended track of the driver may be prevented. In addition, by changing the electric current value that is applied, the electric time constant from the stoppage of the control to the clutch engagement can be adjusted.

BRIEF DESCRIPTION OF DRAWINGS

The features and inventive aspects of the present invention will become more apparent from the following detailed description, the appended claims, and the accompanying drawings, of which the following is a brief description:

DETAILED DESCRIPTION OF THE ILLUSTRATED EMBODIMENTS

Figure 1:
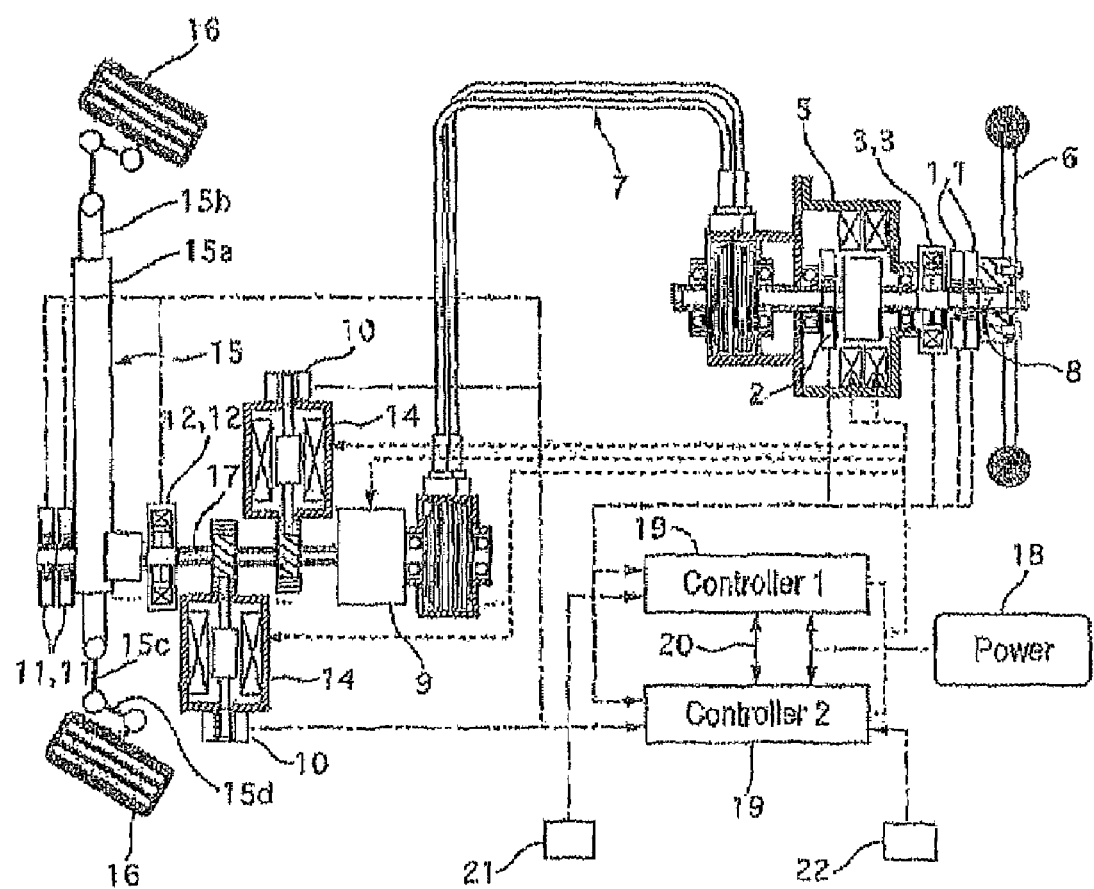
FIG. 1 is a comprehensive schematic view of a steer-by-wire system in which the vehicle steering system according to a first embodiment of the invention is employed.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description.

Referring initially to FIG. 1, the structure of the steer-by-wire system (hereinafter referred to as the "SBW system") is explained. FIG. 1 is a comprehensive schematic view that shows the SBW system in which the vehicle steering system according to a first embodiment of the invention is employed. The vehicle steering system according to the first embodiment is comprised of (1) a reaction system, (2) a backup system, (3) a steered system, and (4) a controller. Each of the components of the vehicle steering system is explained in detail as follows.

(1) Reaction System

The reaction system is comprised of rudder angle sensors 1, 1, an encoder 2, torque sensors 3, 3, a reaction motor 5 and a controller 19.

The rudder angle sensors 1, 1 detect the steering angle of a steering wheel 6 and are provided on a column shaft 8 that connects a cable column 7 and steering wheel 6, and are structured as a double system using two rudder angle sensors. In other words, the rudder angle sensors 1, 1 are provided between the steering wheel 6 and torque sensors 3, 3, so that they can detect the steering angle without being affected by the change in the angle due to the torsion of the torque sensors 3, 3. An absolute type resolver, etc., may be used as the rudder angle sensor 1, 1. The torque sensors 3, 3 are provided between the rudder angle sensors 1, 1 and a reaction motor 5, and are comprised of a double system using two torque sensors.

The reaction motor 5 is comprised of an electric motor with a rotor and a stator, and which uses the column shaft 8 as the rotation shaft, and its casing is fastened at an appropriate location on the vehicle body. As the reaction motor 5, a brushless motor may be used. Along with the use of the brushless motor, the encoder 2 and hole IC (not shown) are added. In that case, the motor driving that generates the motor torque is possible only with the hole IC; however, minute torque fluctuations are generated and the steering reaction is not well conducted. Therefore, to carry out a more precise and smoother reaction control, an encoder 2 is attached on the column shaft 8, and motor control is carried out thereby reducing the minute torque fluctuations and realizing an improvement in the steering reaction. It is also acceptable to use a resolver instead of encoder 2.

(2) Backup System

The backup system that allows mechanical disconnection and connection between the reaction system (1) and the steered system (3) is comprised of a cable column 7 and clutch mechanism 9.

Cable column 7 is a mechanical backup mechanism that demonstrates the column shaft function that transmits the torque while avoiding interference with the member, which exists between the reaction system (1) and steered system (3) during backup mode when the clutch mechanism 9 is engaged. The cable column 7 is structured such that two inner cables, whose end portions are fastened to two reels, are coiled on the reels in the opposite direction from each other, and both ends of the outer tube, in which the two inner cables are inserted, are fastened to the two reel cases.

Figure 2:
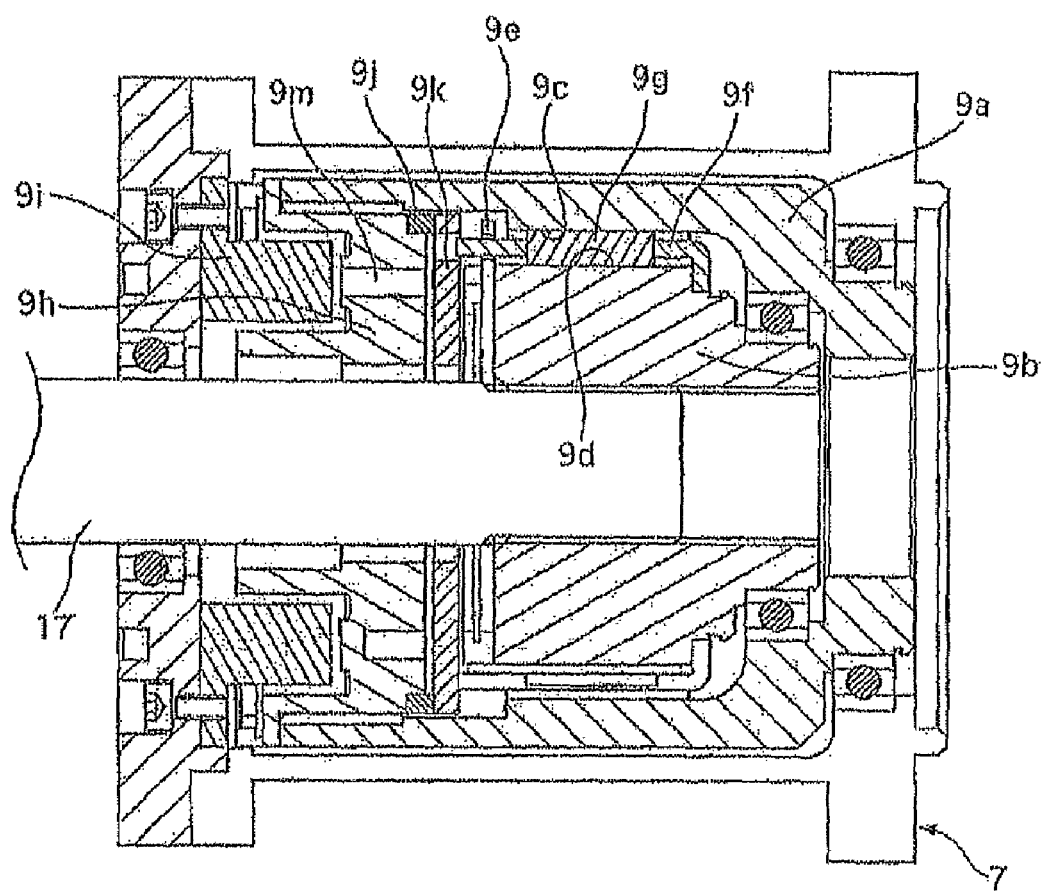
FIG. 2 is a cross-sectional view in the axis direction of a clutch mechanism according to the first embodiment.

The clutch mechanism 9 is an electromagnetic clutch provided on the steered system (3) side. FIG. 2 shows a cross-sectional view in the axis direction of the clutch mechanism 9. The clutch mechanism 9 is comprised of an outer ring 9a that is connected to the cable column 7 and a second rotor 9b that is connected to a pinion shaft 17. Multiple wedge-like spaces are formed between a cylinder-surface 9c, which is the inner circumference of the outer ring 9a and the multiple cam surfaces 9d that are formed on the external circumference of the second rotor 9b. In these wedge-like spaces, a retainer 9f, which is elastically retained in the direction of rotation using a neutral spring 9e, is provided. A roller 9g, which is the engaging part of the outer ring 9a and the second rotor 9b, is arranged in the pocket of the retainer 9f.

A first rotor 9h and an electromagnetic coil 9i are provided on the outer ring 9a. A plurality of permanent magnets 9m are buried in the direction of the circumference of the first rotor 9h. An armature 9k that is allowed to move only in the axial direction is provided between the neutral spring 9e and the first rotor 9h. The armature 9k is biased in the direction that is divided from the first rotor 9h by a divider spring 9j, which is assembled between the armature 9k and the first rotor 9h. The biasing force on the armature 9k by the divider spring 9j is configured so that the output magnetic force of the permanent magnets 9m is smaller than the force to magnetize the armature 9k.

The clutch mechanism 9 applies a current, such that a magnetic force is generated for the electromagnetic coil 9i in the direction that cancels the magnetic force of the permanent magnet 9m when the clutch is released, and does not apply a current such that a magnetic force is generated for the electromagnetic coil 9i in the same direction as the magnetic force of the permanent magnet 9m. Engaging the clutch mechanism 9 allows both torque from the reaction system (1) side and torque from the steered system (3) side to be transmitted via the cable column 7 and the clutch mechanism 9.

(3) Steered System

The steered system is comprised of encoders 10, 10, rudder angle sensors 11, 11, torque sensors 12, 12, steered-side motors 14, 14, a controller 19 and a steering mechanism 15.

The rudder angle sensors 11, 11 and torque sensors 12, 12 are provided on the pinion shaft 17 in which the clutch mechanism 9 is attached to one end and a pinion gear is formed on the other end. An absolute-type resolver, etc., which forms a double system, as with the above-mentioned rudder angle sensors 1, 1, and which detects the revolution number of the shaft, is used as the rudder sensors 11, 11. In addition, the one that forms a double system as with the above-mentioned torque sensors 3, 3, and which detects torque based on the changes in inductance is used as the torque sensors 12, 12. Furthermore, by arranging the rudder angle sensors 11, 11 downstream of the pinion gear, and having the torque sensors 12, 12 upstream, any potential effect from angle changes due to the torsion of the torque sensors 12, 12 during the rudder angle detection by the rudder angle sensors 11, 11 may be reduced.

The steered side motors 14, 14 are structured so that they give a steered torque to the pinion shaft 17 during driving of the motor by having a pinion gear on the motor shaft that engages with a worm gear provided in the middle between the clutch mechanism 9 and torque sensors 12, 12, which are on the pinion shaft 17. The steered side motors 14, 14 form a double system and may be brushless motors that comprise the first steered side motor 14 and the second steered side motor 14. In addition, as with the above-mentioned reaction motor 5, encoders 10, and a hole IC (not shown) are added along with the use of the brushless motor.

The steering mechanism 15 is a steering mechanism that steers the left and right steering controlled wheels 16, 16 by rotation of the pinion shaft 17. The steering mechanism 15 is comprised of: a rack shaft 15b, which is inserted in a rack tube 15a; a rack gear that engages with the pinion gear of the pinion shaft 17; tie rods 15c, 15c that are connected to both ends of the rack shaft 15b and that extend in the left and right directions of the vehicle; and knuckle arms 15d, 15d, for which one end is connected to the tie rods 15c, 15c and the other end is connected to the steering controlled wheels 16, 16.

(4) Controller

A double system is structured as the controller by two controllers 19, 19 that carry out arithmetic control, etc., using a power source 18 and that are connected so that information can be exchanged via a two-way communication line 20.

Detected values from: rudder angle sensors 1, 1, encoder 2, torque sensors 3, 3 and the hole IC of the reaction system (1); encoders 10, 10, rudder angle sensors 11, 11, torque sensors 12, 12 and hole IC of the steered system (3); and vehicle speed sensor 21 that detects the vehicle speed and lateral G/yaw rate sensor 22; are all input to the controller 19.

The controller 19 configures a control value of the reaction motor S and steered side motor 14 based on signals from each sensor and drives and controls each of the motors 5 and 14. In addition, the controller 19 monitors the system status and while the system is working normally, it conducts SBW control (steel-by-wire control by clutch disengagement) and when an abnormality is generated in the system, it switches from SBW control to EPS control (electric power steering control by clutch engagement) or stops the steering control.

Figure 3A:
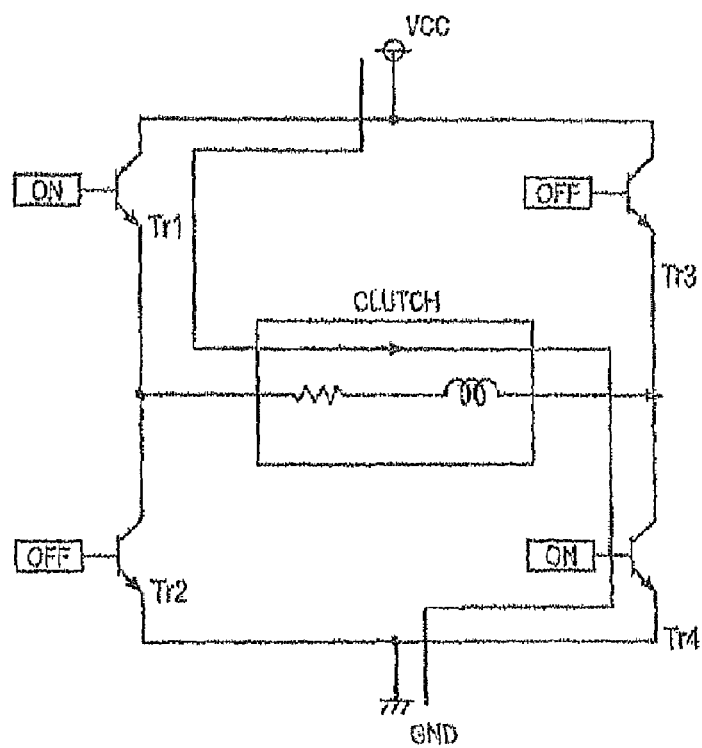
FIG. 3 is a circuit diagram showing the driving circuit structure of the clutch mechanism of FIG. 2 according to the first embodiment.
Figure 3B:
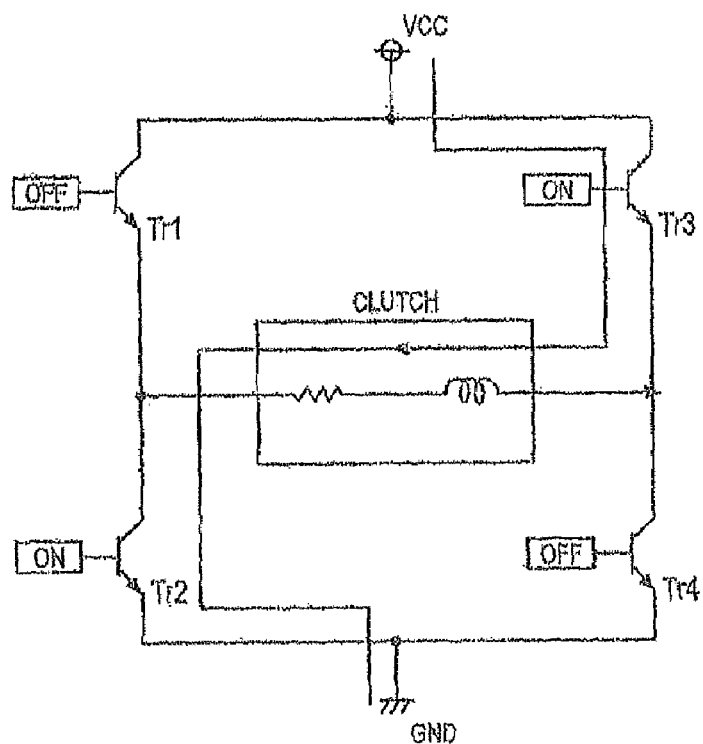

Next the effect is explained. FIG. 3 is a circuit diagram showing the driving circuit structure of the clutch mechanism 9. According to the first embodiment, an H bridge circuit that uses four field-effect transistors TR1 to TR4 is used and by applying a forward reverse current value to the coil of the electromagnetic coil $9i$, it reverses the magnetic force of the coil.

During SBW control by clutch disconnection, as shown in FIG. 3($a$), electric current is applied in the positive direction to the electromagnetic coil $9i$ by turning on the transistors TR1, TR4 (applies voltage to the base), and turning off the transistors TR2 and TR3 (zero base voltage). At this time, a magnetic force is generated at the electromagnetic coil $9i$ in the direction that cancels the magnetic force of the permanent magnet $9m$.

When switching from SBW control to EPS control after transistors TR1 and TR4 are turned off from the condition in FIG. 3($a$), transistors TR2 and TR3 are turned on and a negative electric current is applied to the electromagnetic coil $9i$, and then, a magnetic force with the same direction as the magnetic force of the permanent magnet $9m$ is generated.

Operation of the Clutch System

During the clutch disengagement, the electromagnetic coil $9i$ generates a magnetic force that offsets or weakens the magnetic force of the permanent magnet $9i$ and therefore the repulsive force of the divider spring $9j$ that is assembled with the armature $9k$ overcomes the output magnetic force of the permanent magnet $9j$ and divides the first rotor $9h$ and armature $9k$. When there is no frictional force between the first rotor $9h$ and armature $9k$, the roller $9g$ that is supported by the retainer $9f$ is located at the center of the wedge-like space between the cylinder surface $9c$ and cam surface $9d$ by the neutral spring $9e$ and therefore, the clutch maintains the disengaged status.

During the clutch engagement, the electromagnetic coil $9i$ generates a magnetic force in the same direction as the magnetic force of the permanent magnet $9m$. The combined magnetic force of the output magnetic force of the permanent magnet $9m$ and the output magnetic force of the electromagnetic coil $9i$ overcomes the repulsive force of the divider spring $9j$ and the armature $9k$ and the first rotor $9h$ rotate while being in frictional contact with each other. During the frictional rotation, the outer ring $9a$ and the second rotor $9b$ engage via the roller $9g$ thereby allowing the transmission of the torque.

Steering Control Process

Figure 4:
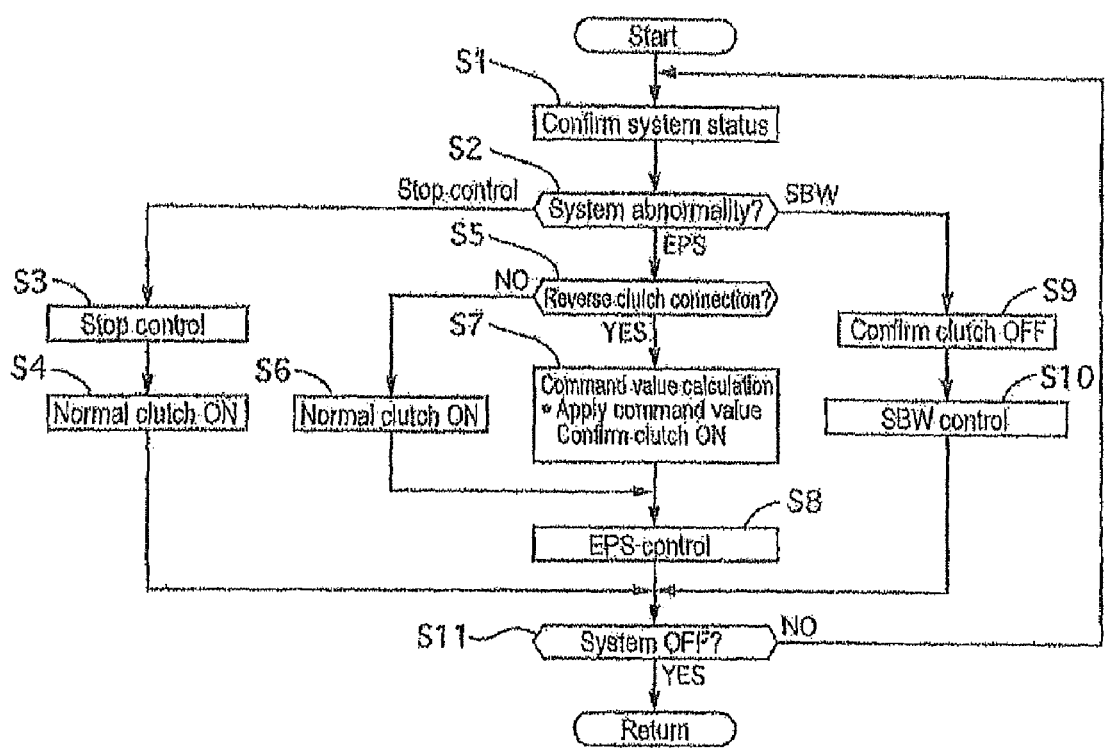
FIG. 4 is a flowchart that shows the flow of the steering control process that is executed by a controller 19 according to the first embodiment.

FIG. 4 is a flow chart that shows the flow of the steering control process that is executed by the controller 19, and each step is described as follows.

At Step S1, the system status is confirmed based on each of the sensor signals, the input signal to each motor, the output signals of each motor, etc., and it proceeds to Step S2. In other words, Step S1 detects reaction abnormality.

At Step S2, based on the system status that is confirmed at Step S1, whether to continue the SBW control or switch to the EPS control or to stop the steering control is selected. To stop the steering control, the steering control process proceeds to Step S3; to switch to EPS control, the steering control process proceeds to Step S5; and to continue SBW control, the steering control process proceeds to Step S9. When the system status is normal, continuation of the SBW control is selected. When there is an abnormality in the system condition, if it is impossible to maintain the steering control such as with a failure of the controller 19, the steering control is stopped, and if either the reaction motor 5 or the steered side motor 14 has failed and the other is normal, the controller switches to EPS control.

At Step S3, the control of the reaction motor 5 and steered side motor 14 by the controller 19 is terminated and it proceeds to Step S4.

At Step S4, the electric current command value to the electromagnetic coil $9i$ is set to zero to engage the clutch mechanism and it proceeds to Step 11.

At Step) S5, whether or not to carry out the reverse connection of the clutch, in other words, whether or not to generate the electric current value $I_c$ in the reverse direction from the clutch disengagement is determined. If YES, it proceeds to Step S7, and if NO, it proceeds to Step S6. Here, when the reaction motor 5 fails, the reverse connection of the clutch is selected.

At Step S6, as with Step S4, the electric current command value $I_c$ to the electromagnetic coil $9i$ is set to zero to engage the clutch mechanism and it proceeds to Step S8.

At Step S7, the electric current command value $I_c$ to be applied to the electromagnetic coil $9i$ when the clutch mechanism 9 is engaged is found, and then the found electric current command value $I_c$ is supplied to the electromagnetic coil $9i$, and after confirming the clutch engagement completion, it proceeds to Step S8. According to the first embodiment, a constant $I_1$ is employed for the electric current command value $I_c$.

At Step S8, based on the signal from each sensor, the EPS control that reduces the steering burden of the driver by using the output torque of the reaction rotor 5 or the steered side motor 14 is executed, and it proceeds to Step S11.

At Step S9, the fact that the clutch mechanism 9 is in the disengaged state is confirmed and it proceeds to Step S10.

At Step S10, based on the signals from each sensor, the control amount for the reaction motor 5 and the steered side motor 14 is configured, and SBW control to drive and control each motor is carried out and then, it proceeds to Step S11.

At Step S11, whether or not the SBW system is turned off or not is determined by the OFF state of the ignition key. When the SBW system is turned off, it proceeds to Return, and when the SBW system is turned on, it proceeds to Step S1.

In other words, when the reaction motor 5 fails, it moves from Step S1→Step S2→Step S5→Step S7 in the flowchart in FIG. 4; and at Step S7, a magnetic force with the same direction as the magnetic force of the permanent magnet $9i$ is generated. After the clutch mechanism is engaged, it proceeds to the EPS control in Step S8.

Reaction Dropping Along with a Delay in the Engagement of the Clutch

The SBW system is loaded with a steered side motor that steers the reaction motor and the steering controlled wheels, and for fail/safe purposes, a clutch mechanism that mechanically connects the steering wheel and the steering controlled wheels is provided.

Conventionally, there have been problems with the SBW system, such as a failure of the reaction motor, a failure of the clutch mechanism, a failure of the steered portion, a failure of an electrical component, etc. In particular, during the failure of the reaction motor, reaction dropping has been a problem when the reaction control is cancelled and the steering wheel and the steering controlled wheels are mechanically connected using a clutch mechanism and switched to EPS control by the steered side motor.

In the conventional SBW system, during SBW control, disengagement of the clutch is maintained such that the magnetic force of the electromagnetic coil is generated in the direction that cancels the magnetic force of the permanent magnet, and therefore the biased force of the divider spring that is assembled in the armature becomes stronger than the magnetic force of the permanent magnet. During the failure of the reaction motor, the supply of the electric current to the electromagnetic coil is stopped and therefore the magnetic force of the electromagnetic coil is attenuated, and when the magnetic force of the permanent magnet overcomes the biased force of the divider spring, the clutch is engaged.

At that time the magnetic force of the electromagnetic coil is attenuated in correspondence to the time constant that is determined from the coil property and the electric current value applied to the coil, and therefore, a delay is generated after the electric current supply to the electromagnetic coil is stopped until the clutch is engaged. In other words, a reaction force dropping in which the reaction force of the steering wheel becomes zero occurs, and therefore, overshooting of the steering angle due to the turning and re-turning or the steering wheel is generated. This overshooting is added to the steered command value for the steered side motor, and therefore the torque deviation on the steered side is transmitted to the driver as a steering imperfection and the intended driving of the vehicle may not be able to be carried out, and when the clutch is engaged, the steering is hindered and therefore the driver feels strange.

Clutch Engagement Effect

In contrast, according to the vehicle steering system in the first embodiment, when the reaction motor 5 fails, the time until the clutch engages can be reduced compared to the above-mentioned prior art by applying the electric current command value $I_c$ to the electromagnetic coil 9i in the same direction as the magnetic force of the permanent magnet 9m as the direction for the clutch engagement.

Figure 5:
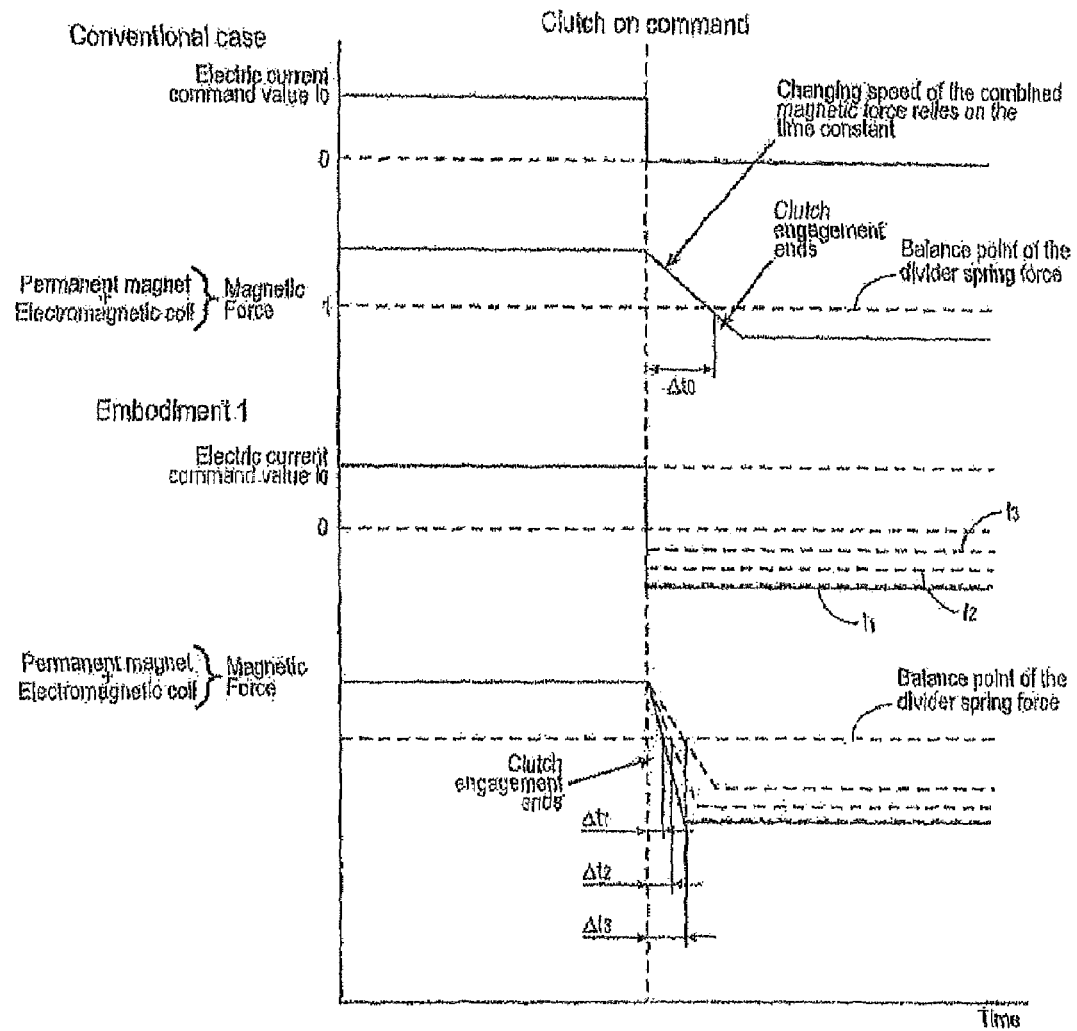
FIG. 5 is a time chart that shows the clutch engagement effect according to the first embodiment.

FIG. 5 is a time chart that shows the clutch engagement effect according to the first embodiment. Conventionally, the engagement delay time $\Delta t_0$ due to the delay in the magnetic change is generated after the electric current command value $I_0$ of the electromagnetic coil is set to be zero and until the clutch is engaged when the combined magnetic force of the permanent magnet and the electromagnetic coil exceeds the biased force of the divider spring.

According to the first embodiment, the electric current value $I_1$ which is in the reverse direction from that for the clutch disengagement is applied to the electromagnetic coil 9i during the clutch engagement, thereby increasing the changing speed of the combined magnetic force of the permanent magnet 9m and the electromagnetic coil 9i, and the delay time $\Delta t_1$ is significantly reduced compared to the conventional delay time $t_0$. In addition, the gradient of the changing speed of the combined magnetic force, namely the time constant can be arbitrarily controlled by adjusting the electric current command values ($I_2$, $I_3$) to be applied to the electromagnetic coil 9i. The larger the electric current command value becomes the shorter the time constant becomes, and therefore the reaction dropping time can be reduced ($\Delta t_2$, $\Delta t_3$).

Consequently, a reduction of the reaction dropping time allows a reduction of the amount of overshooting of the steering angle, and the overshooting value of the steering angle is transmitted to the steered-side motor 14 as the steered command value, thereby reducing hindering of the steering after clutch engagement due to the input of a large steering torque to the steering wheel 6 during clutch engagement.

For example, if the reaction motor fails when a large steering reaction is generated while steering at a constant rudder angle (for example, during high speed driving with a large R), and SBW control is switched to EPS control, the driver receives the reaction. If the reaction disappears, the driver may excessively turn the steering wheel 6. When the amount of overshooting of the steering angle is transmitted as the command value to the steered-side motor 14, the steering control wheels 16 and 16 are turned too much. Therefore, when the clutch is engaged, the torque deviation on the steered side is transmitted as the steering torque and the vehicle demonstrates a performance that is not intended by the driver.

Figure 6:
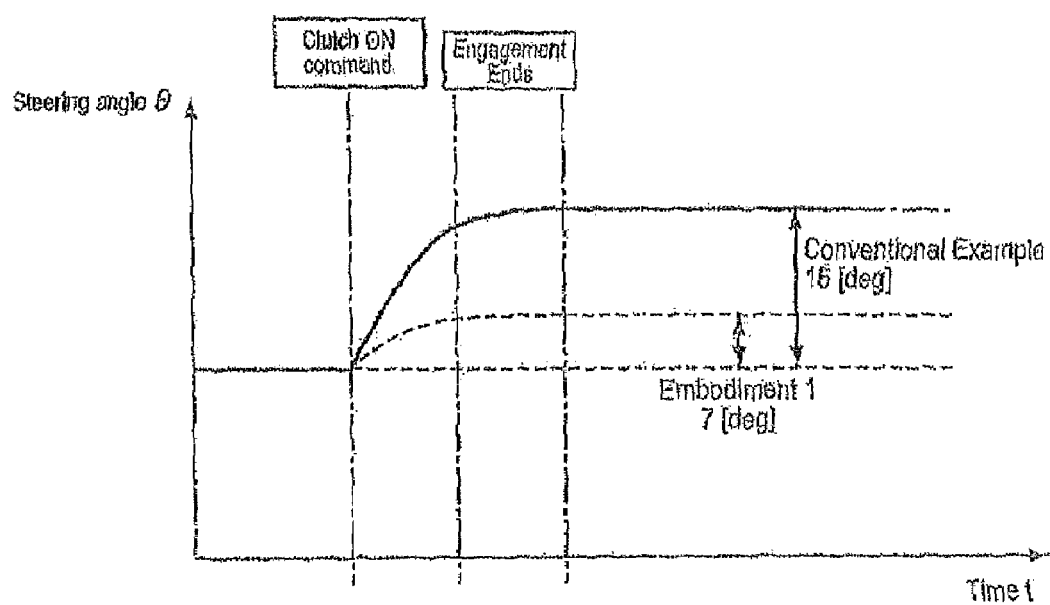
FIG. 6 is a drawing showing the reduction effect of the reaction dropping according to the first embodiment.

According to the first embodiment, reduction of the reaction dropping time allows a reduction of the amount of overshooting of the steering angle. Turning in excess of the driver's intended steered angle can be prevented and additionally the amount of overshoot as a command value to the steered-side motor 14 can be reduced. Consequently, the torque deviation can be reduced and the excessive steering torque at the clutch engagement can be reduced and therefore, the vehicle behavior can be controlled in a stable manner (FIG. 6).

Next the effect is explained as follows. The following effects can be obtained according to the vehicle steering system of the first embodiment.

The vehicle steering system is provided having the steering wheel 6, the steering reaction system, steering controlled wheels 16, 16, the steered system (3), the clutch mechanism 9 that mechanically connects the reaction system and steered system wherein the clutch mechanism 9 has the permanent magnet 9m and the electromagnetic coil 9i so as to form the electromagnetic clutch that releases when a current is applied such that the magnetic force in the direction that cancels the magnetic force of the permanent magnet 9m that is generated for the electromagnetic coil 9i, and that engages when a current is not applied to the electromagnetic coil 9i, and the controller 19 (Step S7) that generates a magnetic force in the same direction as the magnetic force direction of the permanent magnet 9m for the electromagnetic coil 9i when an abnormality is generated for the steering system. Therefore, the reaction dropping time due to the delay in the clutch engagement can be reduced and deterioration of the following by the vehicle of a target track of the driver may be prevented.

The controller 19 (Step S2) that detects an abnormal reaction in the reaction motor 5 is provided, and the controller 19 generates a magnet force for the electromagnetic coil 9i in the same direction as the magnet force direction of the permanent magnet 9m. Therefore the time from the generation of the abnormality in the reaction motor 5 until the clutch mechanism 9 is engaged can be reduced, thereby reducing the reaction dropping time.

A vehicle steering system according to a second embodiment is a case in which the electric current command value at the time of the clutch engagement is varied depending on the steering input and vehicle speed. It has the same structure as that of the first embodiment and therefore, the description is omitted.

At the time of clutch engagement, the controller 19 changes the electric current command value to be supplied to the electromagnetic coil 9i depending on the detected value from the rudder angle sensors 1, 1, torque sensors 3, 3, vehicle speed sensor 21, and lateral G/yaw-rate sensor 22.

Next the effect is described.

Steering Control Process

The flow of the steering control process executed by the controller 19 according to the second embodiment is basically the same as the first embodiment, which is shown in FIG. 4. Nonetheless, the second embodiment is different at the point in which the electric current value $I_c$ is found based on the steering torque T, the steering angle speed $d\theta/dt$, the vehicle speed V and the yaw-rate Y in Step S7 in FIG. 4 from the first embodiment.

Electric Current Control Method

A method to change the PWM frequency is used as the electric current control method for the electromagnetic coil 9i. According to this method, electric current control is carried out by switching the base or gate of the transistor on one of either the upstream side or downstream side on the H bridge circuit, using the PWM frequency. The electric current command value is configured with advance testing, etc., so that the reaction dropping becomes the allowable clutch engagement time.

Configuration Method of the Electric Current Command Value

Figure 7:
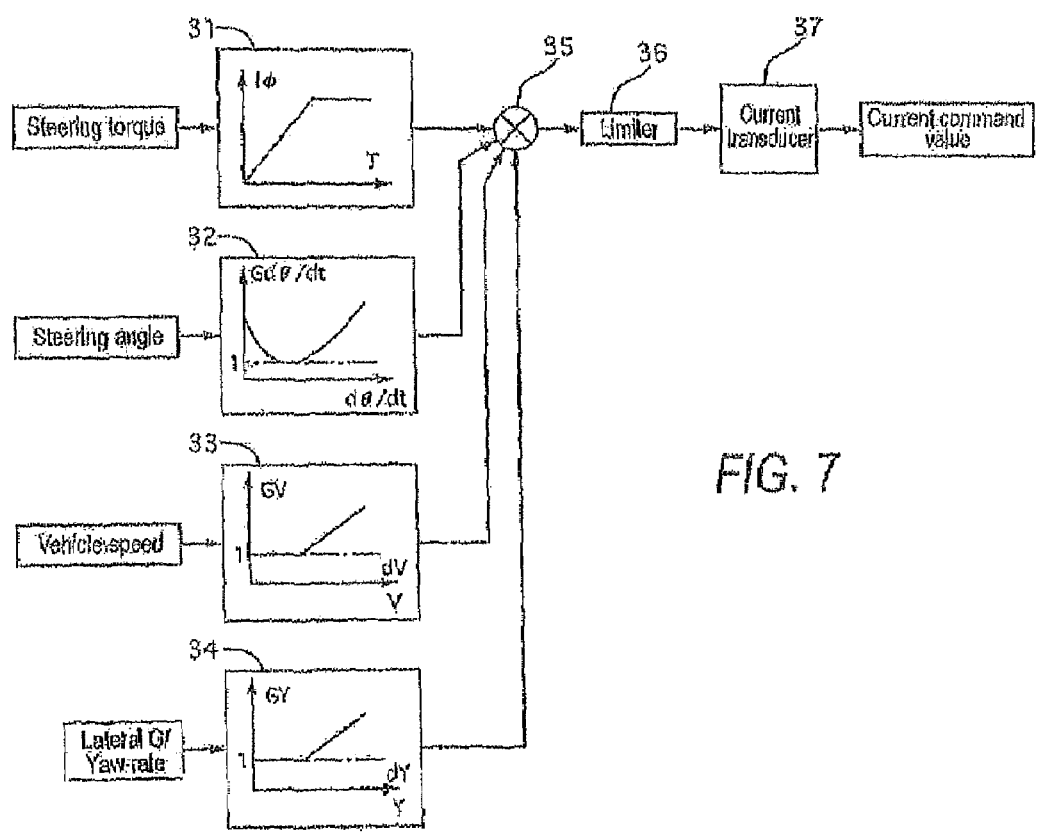
FIG. 7 is an electric current command value calculation block according to a second embodiment.
Figure 8:
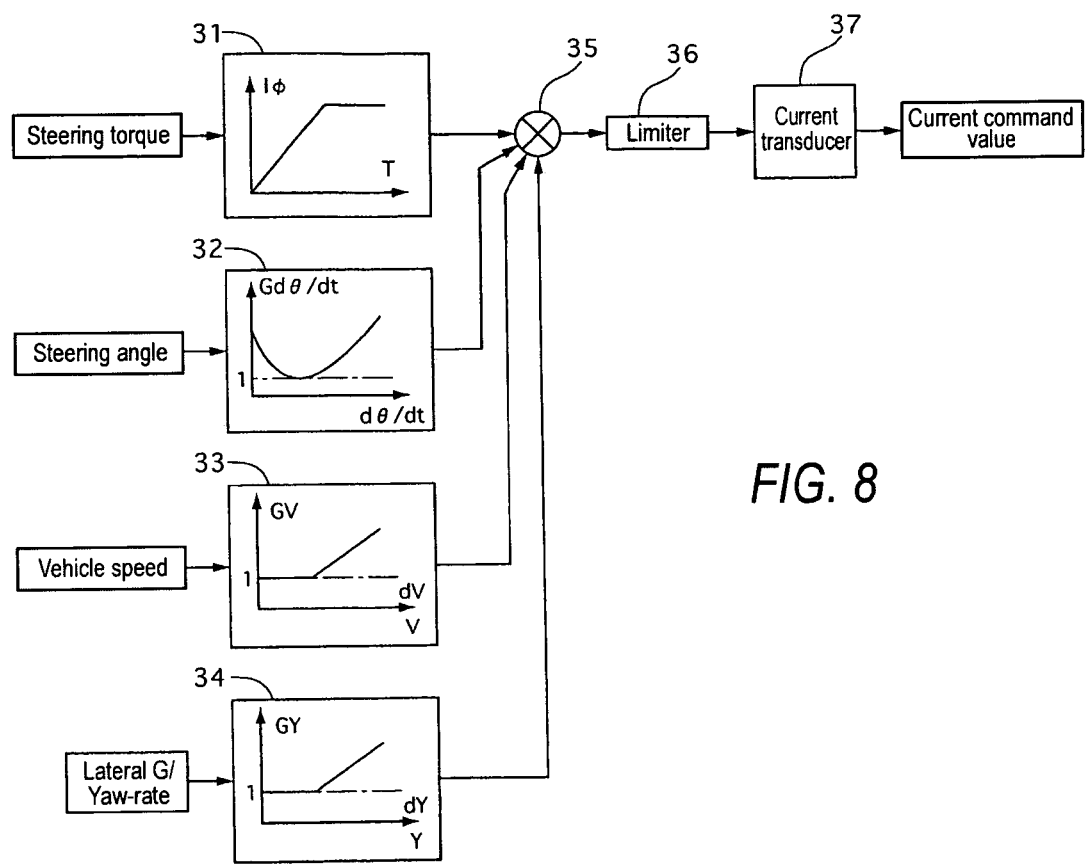

FIG. 7 is an electric current command value calculation block according to the second embodiment. According to the second embodiment, the electric current command value at the clutch engagement is found in correspondence to the steering torque detected by the torque sensors 3, 3; the steering angle detected by the rudder angle sensors 1, 1; the vehicle speed detected by the vehicle speed sensor 21; and the lateral G/yaw-rate detected by the lateral G/yaw-rate sensor 22.

In FIG. 7, the base electric current command value calculation block 31 calculates the base electric current command value $I_\phi$ based on the steering torque T. The base electric current command value $I_\phi$ is configured so that the larger the steering torque T becomes, the larger the value it takes. A maximum value is configured for the base electric current command value $I_\phi$ thereby preventing an excessive electric current command value.

The steering angle speed gain calculation block 32 finds the steering angle speed gain $G_{d\theta/dt}$ based on the steering angle speed $d\theta/dt$ that is found by differentiating the steering angle theta. The steering angle speed gain $G_{d\theta/dt}$ is configured so that it takes a larger value when the steering angle speed $d\theta/dt$ takes a smaller value in the minimum area where the steering angle speed $d\theta/dt$ becomes smaller than the designated value, and in the area with a high steering angle speed $d\theta/dt$, it takes a larger value when the steering angle speed $d\theta/dt$ takes a higher value. In other words, in the minimum area for the steering speed $d\theta/dt$, it corresponds to a large reaction dropping under constant steering, and in the area with a high steering angle speed $d\theta/dt$, it corresponds to the reduction of overshooting for the reaction dropping in the high speed steering area. The second embodiment sets the minimum area to be 15 [deg/s] or less, and the high steering area to be the area with 75 [deg/s] or greater.

With high speed steering, the cases of relatively high speed steering during a steering wheel operation to avoid dangers, or at a S-shape corner during winding driving are taken into amount. During high speed steering it is difficult to match the steering angle to the vehicle behavior due to the reaction dropping, and therefore often it goes off the driver's intended driving line. In such cases, the fluctuation in the behavior can be reduced by taking a large steering angle speed gain $G_{d\theta/dt}$.

Under conditions between the minimum area and high speed steering area, when driving in corners with low-speed turning, etc., the driver is allowed to match the steering angle with the reaction dropping and the vehicle behavior and the driver's intended driving line can be maintained, and therefore, in contrast, a mild transition to ESP control can reduce the reaction changes and keep the shock to the driver minimum.

The vehicle speed gain calculation block 33 finds the vehicle speed gain GV based on the vehicle speed V. The vehicle speed gain GV is configured so that the higher the vehicle speed V becomes, the higher the value it takes. When the vehicle speed is high, due to the amount of overshooting because of the reaction dropping, it is included in the steered command value of the steering control wheels 16, 16 and the torque deviation on the steered side takes on a large steering torque at the clutch engagement. In addition, it is difficult for the driver to match the steering angle due to the reaction dropping and the vehicle behavior. Therefore by reducing the amount of overshooting, it reduces the incidence in which it deviates from the driver's intended driving line. According to the second embodiment, the approximate speed to increase the vehicle speed gain GV is set at 80 km/h.

The lateral G/yaw-rate gain calculation block 34 finds the yaw-rate gain GY (or lateral G gain) based on the yaw-rate Y (or lateral G). The yaw-rate gain GY (or lateral & gain) is configured so that the larger the yaw rate Y becomes (or lateral G), the larger the value it takes. By doing so, the vehicle behavior can be stabilized. According to the second embodiment, the yaw-rate gain GY is increased from approximately 0.3 [G].

The multiplier 35 finds the electric current command value $I_c$ from the steering angle speed gain $G_{d\theta/dt}$ and the vehicle speed gain GV, and the yaw-rate gain GY using the following formula:

$$(1). I_c = I\phi \times G_{d\theta/dt} \times GV \times GY \qquad (1)$$

The limiter 36 configures the maximum value of the electric current command value $I_c$ that is found by the multiplier 35. The block 37 converts the output from the limiter 36 and outputs the electric current command value.

In addition to the effects achieved in connection with the first embodiment, the following effects can be obtained from the vehicle steering system according to second embodiment.

As the steering torque T becomes larger, the controller 19 takes a larger electric current command value $I_c$ for the electromagnetic coil 9i and therefore, the amount of overshooting (turning angle) of the steering wheel when the steering torque T becomes zero during the dropping of the reaction can be reduced and the shock at the clutch engagement can be reduced.

In the area with the minimum steering angle speed $d\theta/dt$, as the steering angle speed $d\theta/dt$ becomes smaller, the controller 19 takes a larger electric current command value $I_c$ for the electromagnetic coil 9i and therefore, the reaction dropping during constant steering can be reduced and the shock at the clutch engagement can be reduced.

In the area with a high steering angle speed $d\theta/dt$, as the steering angle speed $d\theta/dt$ becomes higher, the controller 19 takes a larger electric current command value $I_c$ for the electromagnetic coil 9i and therefore the amount of overshooting of the steering wheel 6 during high speed steering while avoiding a danger or S-shaped corners, etc., can be reduced and the deterioration of following the intended track of the driver can be prevented.

As the vehicle speed V becomes faster, the controller 19 takes a larger electric current command value $I_c$ for the electromagnetic coil 9i and therefore, the vehicle behavior during turning is stabilized and the deterioration of the following of the intended track of the driver can be prevented.

As the yaw-rate Y (or lateral G) becomes larger, the controller 19 takes a larger electric current command value $I_c$ for the electromagnetic coil and therefore, the vehicle behavior during turning is stabilized and the deterioration of the following of the intended track of the driver can be prevented.

The best mode for carrying out the present invention was described by referring to the first and second embodiments above. The detailed structure of the present invention is not limited to the structures in first and second embodiments. For example, the first embodiment shows an example with an abnormality in the reaction motor; nonetheless it can apply to the case with an abnormality in the steered-side motor, and consequently the steered force dropping due to the delay in the clutch engagement can be reduced. In other words, the present invention can be applied as long as there is an abnormality in the steering system in which a reaction or steered force dropping is generated due to the clutch engagement.

In the second embodiment, an example using the yaw-rate (or lateral G) as the turning amount is shown; nonetheless, the steering angle can be used. In addition, in the second embodiment, a method that changes the PWM frequency is used as the electric current control method of the electromagnetic coil; nonetheless, a method to change the voltage of the H bridge circuit can be used. This method is to provide a transformer, etc., for the power source to adjust the battery voltage depending on the electric current command value, thereby limiting the electric current for magnetizing of the electromagnetic coil during the clutch engagement. When using this method, a voltage transducer block is used instead of the electric current transducer block 37 in FIG. 7.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A vehicle steering system comprising:
   a steering portion having an operations input mechanism and a reaction adding device;
   a steered portion having steering controlled wheels and a steered force adding device; and
   a clutch mechanism that mechanically connects the steering portion and steered portion through an engagement;
   wherein the clutch mechanism has a permanent magnet and an electromagnetic coil so as to form an electromagnetic clutch that releases when a current is applied such that a magnetic force in a direction that cancels a magnetic force of the permanent magnet is generated for the electromagnetic coil, and that engages when a current is not applied to the electromagnetic coil; and
   a clutch engagement controller that generates the magnetic force in the same direction as the magnetic force direction of the permanent magnet for the electromagnetic coil when an abnormality is generated for the steering system.

2. A vehicle steering system according to claim 1 further comprising:
   a reaction abnormality detector that detects abnormality of the reaction adding device;
   wherein the clutch engagement controller generates the magnetic force in the same direction as the magnetic force direction of the permanent magnet for the electromagnetic coil when the abnormality of the reaction adding device is detected.

3. A vehicle steering system according to claim 1, further comprising:
   a steering abnormality detector that detects abnormality of the steered force adding device;
   wherein the clutch engagement controller prevents current from flowing through the electromagnetic coil when the abnormality of the steered force adding device is detected.

4. A vehicle steering system according to claim 1 further comprising:
   a steering input detector that detects steering input from the operations input mechanism, and
   wherein the clutch engagement controller increases an electric current value that is applied to the electromagnetic coil as the detected steering input from the steering input detector becomes larger.

5. A vehicle steering system according to claim 4 wherein, the steering input detector detects steering input speed, and the clutch engagement controller increases the electric current value to be applied to the electromagnetic coil as the detected steering input speed decreases when the vehicle steering system is in a predetermined slow steering input range.

6. A vehicle steering system according to claim 4 wherein, the steering input detector detects steering input speed, and the clutch engagement controller increases the electric current value to be applied to the electromagnetic coil as the detected steering input speed increases when the vehicle steering system is in a predetermined fast steering input range.

7. A vehicle steering system according to claim 1 further comprising:
   a vehicle speed detector that detects vehicle speed; and
   wherein the clutch engagement controller takes on a larger electric current value to be applied to the electromagnetic coil as the vehicle speed increases.

8. A vehicle steering system according to claim 1 further comprising:
   a turning amount detector that detects amount of turning of the vehicle; and
   wherein the clutch engagement controller takes on a larger electric current value to be applied to the electromagnetic coil as the amount of turning of the vehicle increases.

9. A vehicle steering system comprising:
   a steering portion having an operations input means and a reaction adding means;
   a steered portion having steering controlled wheels and a steered force adding means;
   a clutch means that mechanically connects the steering portion and steered portion through an engagement wherein:
   the clutch means has a permanent magnet and an electromagnetic coil so as to form an electromagnetic clutch means that releases when current is applied to the electromagnetic coil and engages when current is not applied to the electromagnetic coil; and a clutch engagement control means that generates a magnetic force in a predetermined direction for the electromagnetic coil when an abnormality is generated for the steering system.

10. A steering control method for a vehicle steering system having a steering portion and a steered portion, the method comprising:

providing an electromagnetic clutch that comprises a permanent magnet and an electromagnetic coil for mechanically connecting the steering portion to a steered portion by engagement;

generating a magnetic force in the electromagnetic coil in a normal operation, in a direction in which a magnetic force of the permanent magnet is canceled, thereby releasing the electromagnetic clutch;

controlling the steered portion according to a steering operation of the steering portion; and generating a magnetic force in the electromagnetic coil in the same direction as the magnetic direction of the permanent magnet when an abnormality is generated for the steering system.

* * * * *